(12) United States Patent  (10) Patent No.: US 8,259,548 B2
Minamiguchi et al.  (45) Date of Patent: Sep. 4, 2012

(54) OPTICAL DISC DEVICE AND DISC IDENTIFICATION METHOD

(75) Inventors: Shuichi Minamiguchi, Tokyo (JP); Hiroharu Sakai, Tokyo (JP); Hajime Nishimura, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 11 days.

(21) Appl. No.: 12/952,416

(22) Filed: Nov. 23, 2010

(65) Prior Publication Data

US 2011/0158074 A1   Jun. 30, 2011

(30) Foreign Application Priority Data

Dec. 25, 2009  (JP) ................................. 2009-294151

(51) Int. Cl.
*G11B 7/00*   (2006.01)

(52) U.S. Cl. .................................. 369/53.22

(58) Field of Classification Search ............... 369/53.22, 369/53.1, 47.5, 47.51, 47.52, 47.1, 47.27, 369/116, 47.53, 275.3

See application file for complete search history.

(56) References Cited

U.S. PATENT DOCUMENTS

| 7,609,599 B2* | 10/2009 | Juan ........................... 369/53.23 |
| 7,924,689 B2* | 4/2011 | Fukuhara ...................... 369/116 |
| 8,068,391 B2* | 11/2011 | Muto et al. ................. 369/47.19 |
| 2005/0030871 A1* | 2/2005 | Kato et al. ................. 369/59.11 |
| 2010/0172230 A1* | 7/2010 | Furumiya ..................... 369/116 |

FOREIGN PATENT DOCUMENTS

JP   2007-018581   1/2007

* cited by examiner

*Primary Examiner* — Nabil Hindi
(74) *Attorney, Agent, or Firm* — Antonelli, Terry, Stout & Kraus, LLP.

(57) ABSTRACT

To identify the type of a loaded disc, there is provided an optical disc device, comprising: a light source driven by a drive signal with a high frequency signal superimposed; a detector for detecting return light emitted from the light source; and a controller for controlling the amplitude of the high frequency signal to be superimposed on the drive signal, the optical disc device being configured to read data from an optical disc loaded therein by a signal outputted from the detector, wherein: the controller causes the light source to irradiate the loaded optical disc with light in a condition in which a high frequency signal different from a high frequency signal for data reading is superimposed on the drive signal; and the controller identifies a type of the loaded optical disc based on the return light from the loaded optical disc.

10 Claims, 7 Drawing Sheets

OPTICAL DISC DEVICE AND DISC IDENTIFICATION METHOD

CLAIM OF PRIORITY

The present application claims priority from Japanese patent application JP 2009-294151 filed on Dec. 25, 2009, the content of which is hereby incorporated by reference into this application.

BACKGROUND OF THE INVENTION

This invention relates to an optical disk device, and in particular, relates to a method of identifying the type of an optical disc loaded therein.

Optical disc is generally classified into CD (Compact Disc), DVD (Digital Versatile Disc), and BD (Blu-ray Disc). Furthermore, there are a plurality of types, such as ROM (read only), -R (writable), and -RE (rewritable), in each kind of disc; playing conditions are different depending on the type of disc. For this reason, an optical disk device is required to identify the type of a disc loaded therein.

Conventionally, optical disc devices identify the type of disc through any one of the following methods to perform playing sequences differing depending on the type of disc:

(1) a method of reading management information recorded in a Burst Cutting Area (BCA) to identify the type of disc by the read management information;

(2) a method of identifying the type of disc by Differential Phase Detection (DPD) amplitude; and (3) a method of identifying the type of disc by RF amplitude.

For example, JP2007-18581A discloses a technique related to this invention.

As described above, there are various methods for an optical disc device to identify the type of a disc loaded therein. The above-described method (1) enables reliable disc identification because the disc standard stipulates that the type of disc must be recorded in management information (a BCA). Actually, however, there are discs without BCAs. Furthermore, if a BCA is unclean or scratched, the BCA data might be unable to be read from the disc.

DPD is used for tracking adjustment, but tracking adjustment can be made through other methods. Therefore, in an optical disc device which does not employ the DPD, the method (2) cannot be used.

The method using RF signal amplitude utilizes the phenomenon that the intensity of a signal obtained from the return light from a data area, in which data is written, differs depending on the disc, namely, that ROM type discs have greater reflectance and RF amplitude is likely to be larger because of their structure, while -R and -RE type discs have smaller reflectance. However, the reflectance of disc considerably varies among discs, so the identification using reflectance has been less reliable.

For these reasons, the type of a loaded disc sometimes cannot be identified exactly even through the above-described three methods. A method for exactly identifying the type of disc has been desired.

An object of this invention is to provide a method of identifying the type of a loaded disc, particularly whether the disc is a read only (ROM) disc or a writable (-R or -RE) disc.

SUMMARY OF THE INVENTION

A representative aspect of this invention is as follows. That is, there is provided an optical disc device, comprising: a light source driven by a drive signal with a high frequency signal superimposed; a detector for detecting return light emitted from the light source; and a controller for controlling the amplitude of the high frequency signal to be superimposed on the drive signal, the optical disc device being configured to read data from an optical disc loaded therein by a signal outputted from the detector. The controller causes the light source to irradiate the loaded optical disc with light in a condition in which a high frequency signal different from a high frequency signal for data reading is superimposed on the drive signal. The controller identifies a type of the loaded optical disc based on the return light from the loaded optical disc detected by the detector.

According to an aspect of this invention, a loaded disc can be identified as either a read only disc or a writable disc.

BRIEF DESCRIPTION OF THE DRAWINGS

The present invention can be appreciated by the description which follows in conjunction with the following figures, wherein.

DETAILED DESCRIPTION OF THE EMBODIMENTS

Figure 1:
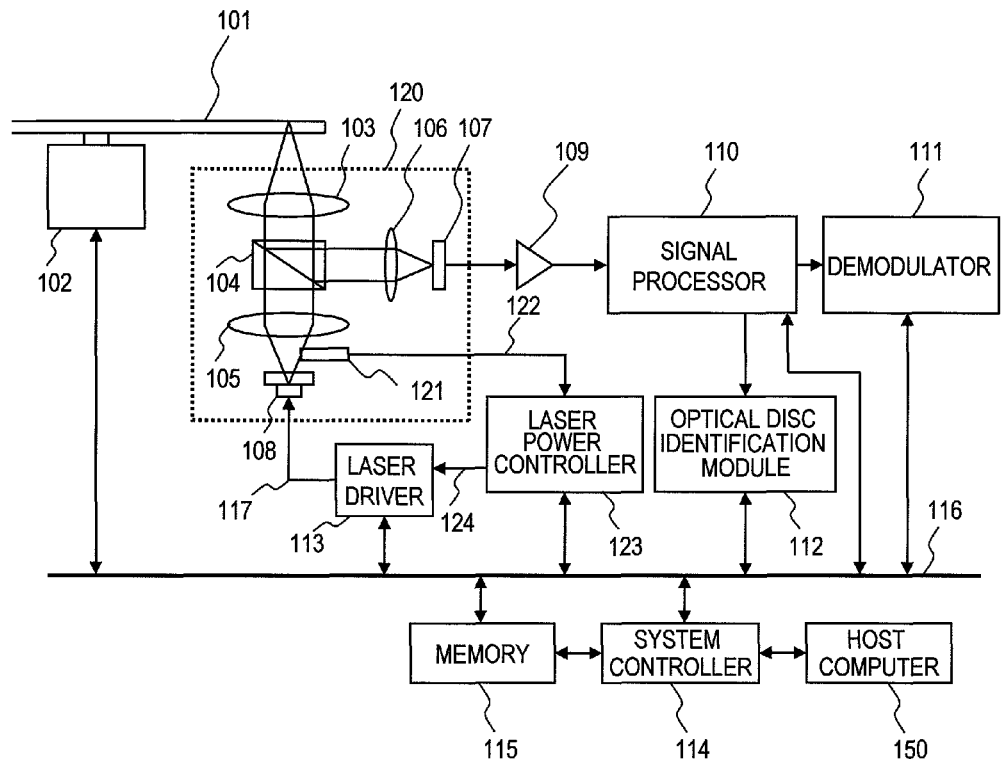
FIG. 1 is a block diagram illustrating a configuration of an optical disc device according to an embodiment of this invention.

FIG. 1 is a block diagram illustrating a configuration of an optical disc device 100 according to an embodiment of this invention.

The optical disc device 100 in this embodiment is coupled to a host computer 150 and outputs data read from a loaded optical disc 101 (for example, a Blu-ray Disc) to the host computer 150. The optical disc device 100 may have a function of recording data received from the host computer 150 onto a writable optical disc 101.

The optical disc device in this embodiment comprises a spindle motor 102, an I/V converter 109, a signal processor 110, a demodulator 111, an optical-disc identification module 112, a laser driver 113, a system controller 114, a memory 115, a data bus 116, an optical pickup 120, and a laser power controller 123.

The spindle motor 102 rotates and drives an optical disc 101 loaded in the optical disc device 100.

The optical pickup 120 comprises an objective lens 103, a splitter 104, a collimating lens 105, a collecting lens 106, a photoelectric converter 107, a laser beam source 108, and a monitor diode 121. When read data from an optical disc 101, the optical pickup 120 irradiates the optical disc 101 with a weak laser beam, reads data recorded on the optical disc 101 using the reflection of the laser beam (return light), and outputs an RF signal corresponding to the reflection.

The laser beam source 108 is a semiconductor laser that generates a desired intensity of laser beam for recording and playing, and emits a laser beam having a wavelength specified for each type of disc to be loaded. The laser beam emitted from the laser beam source 108 impinges on a specific radial position of the recording surface of the optical disc 101 through the collimating lens 105 and the objective lens 103. The objective lens 103 is driven by an actuator to adjust the laser beam to be focused on the disc surface.

In recording data onto the optical disc 101, the laser beam source 108 irradiates the optical disc 101 with a more intensive laser beam than in playing data therefrom. By thermal phase-change at the spot where the laser beam has impinged on the optical disc 101, a recording pit is formed on the recording layer. The recording pit changes the reflectance of the recording layer to record data. It should be noted that a part of the return light enters the laser beam source 108.

The laser light reflected on the recording surface of the optical disc 101 is split by the splitter 104, collected by the collecting lens 106, and introduced to the photoelectric converter 107. The photoelectric converter 107 converts the received reflected light into an electric signal (an RF signal) and outputs the RF signal corresponding to the return light.

The monitor diode 121 is for detecting laser power for APC (Automatic Power Control). The signal bandwidth for the monitor diode 121 may be sufficiently low compared with the high-frequency wave which is superimposed on the laser beam in playing. The monitor diode 121 output signal 122 detected by the monitor diode 121 is sent to the laser power controller 123.

The I/V converter 109 converts a current signal outputted from the photoelectric converter 107 into a voltage signal (an RF signal) and amplifies it. The signal processor 110 is a DSP (Digital Signal Processor), which converts the RF signal outputted from the I/V converter 109 into digital data. The signal processor 110 outputs an optical disc identifier signal differing depending on the structure of the optical disc, a focus error signal for adjusting the focal point of a laser beam, and a tracking error signal for following a track of the optical disc 101.

The demodulator 111 demodulates the digital data outputted from the signal processor 110 in accordance with the format specified for each type of optical disc, performs error detection and error correction on it, and then temporarily stores the demodulated data in the memory 115 (buffer).

The optical disc identification module 112 identifies the type of the loaded optical disc 101 with reference to the optical disc identifier signal outputted from the signal processor 110. It should be noted that the optical disc identification module 112 may be constituted by a program to be executed by the system controller 114.

The identification result on the optical disc 101 outputted from the optical disc identification 112 is sent to the system controller 114 via the data bus 116. The system controller 114 controls modules to be in optimum conditions (playing conditions and writing conditions) for the identified optical disc based on the identification result of the optical disc.

The laser driver 113 outputs a laser drive signal 117 for driving the laser beam source 108 in the optical pickup 120. The laser power controller 123 sets laser power target values in playing and writing in accordance with the type of the optical disc identified by the optical disc identification module 112.

The system controller 114 comprises a microprocessor for controlling operations of the optical disc device 100 and a memory. The memory in the system controller 114 stores a program to be executed and data necessary for executing the program. The system controller 114 further comprises an interface for controlling sending and receiving of data and commands between the optical disc device 100 and the host computer 150 coupled thereto. The system controller 114 controls reading of data temporarily stored in the memory 115 and writing of data to the memory 115. The system controller 114 interprets a command received from the host computer 150 and processes the received command.

The memory 115 includes a buffer area in which data read from the optical disc 101 is temporarily stored. The data bus 116 connects modules in the optical disc device 100.

Figure 2:
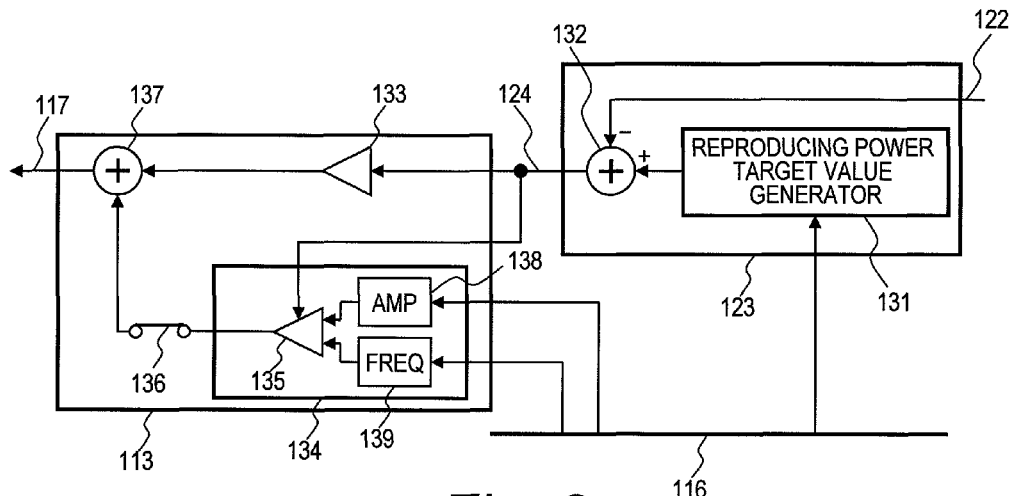
FIG. 2 is a block diagram illustrating a configuration of a laser driver and a laser power controller according to an embodiment of this invention.

FIG. 2 is a block diagram illustrating a configuration of the laser driver 113 and the laser power controller 123.

The laser power controller 123 comprises a playing power target value generator 131 and a subtractor 132.

First, in accordance with the type of the optical disc 101 identified by the optical disc identification module 112, the system controller 114 sets a target value of the average laser power for playing the optical disc on a playing power target value generator 131. The subtractor 132 calculates the difference value 124 between the target value set on the playing power target value generator 131 and the monitor diode's output value 122. The calculated difference value 124 is sent to the laser driver 113.

The laser driver 113 comprises an amplifier 133, a high-frequency signal generator 134, a switch 136, and an adder 137.

The laser driver 113 controls the intensity of the laser beam to be outputted from the laser beam source 108 with the difference value 124 calculated by the laser power controller 123. This control compensates for a temperature change around the laser beam source 108 and a change in the I/L (current to luminance) ratio caused by degradation over time to achieve stable control of the intensity of the laser beam.

The amplifier 133 amplifies a received difference value 124 and sends the amplified value to the adder 137.

The high frequency signal generator 134 comprises a variable gain amplifier 135, an amplitude controller 138, and a frequency controller 139, and generates a high-frequency signal to be superimposed onto the laser drive signal 117.

The amplitude and the frequency of the high-frequency signal to be outputted from the high-frequency signal generator 134, or the amplitude and the frequency of the high-frequency signal to be superimposed onto the playing laser power, can be determined by the system controller 114. Specifically, the amplitude controller 138 controls the amplitude of the high-frequency signal to be superimposed with the value determined by the optical disc identification module 112 or the system controller 114. The frequency controller 139 controls the frequency of the high-frequency signal to be superimposed with the value determined by the optical disc identification module 112 or the system controller 114.

The variable gain amplifier 135 amplifies an amplitude signal outputted from the amplitude controller 138 and the high-frequency signal outputted from the frequency controller 139 with the gain controlled by the difference value 124 to generate a high-frequency signal having a desired amplitude.

The switch 136 controls on and off of the high-frequency signal generator 134.

When the switch 136 is off, the high-frequency signal generator 134 does not output a high-frequency signal, so a high-frequency signal is not superimposed onto the laser output. In this state, the return light, which is light reflected on the surface of the optical disc 101 and incoming into the laser beam source 108, cause interference with resonance cavity of a laser diode included in the laser beam source 108. Thus, the laser beam is emitted with an amplitude tremor. Hence, the signal quality (S/N ratio) is degraded.

On the other hand, in the state in which the amplitude of superimposed high-frequency signal is excessive, an erroneous data is recorded on the optical disc 101 and a recording layer of the optical disc degrades in relation of the peak power of the laser beam in which high-frequency signal is superimposed.

Therefore, the amplitude of superimposed high-frequency signal should be adjusted to moderate amplitude.

The adder 137 adds the output of the amplifier 133 and the output of the high-frequency signal generator 134. The output of the adder 137 is outputted as a laser drive current 117 from the laser driver 113.

Figures 3, 4:
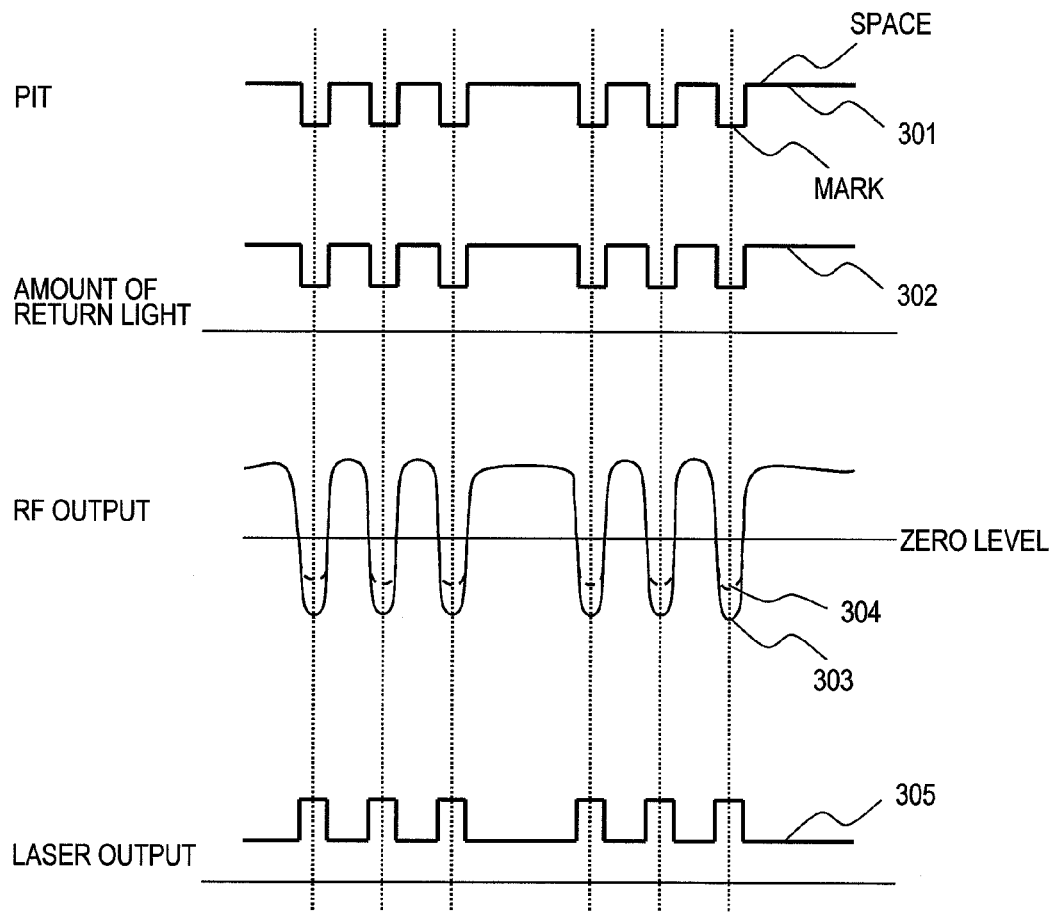
FIG. 3 is an explanatory diagram illustrating a principle that a photoelectric conversion element generates an asymmetric output according to an embodiment of this invention.
FIG. 4 is an explanatory diagram illustrating measured asymmetry outputted from the photoelectric conversion element according to an embodiment of this invention.

FIG. 3 illustrates a principle that the photoelectric converter 107 generates an asymmetric output.

An optical disc, particularly a ROM-type disc e.g. a BD-ROM, has pits 301 formed by indenting a substrate made of synthetic resin (for example, polycarbonate); the amount of the return light 302 changes around a pit. The photoelectric converter 107 detects the change of the return light to read data from the optical disc. Accordingly, the RF signal 303 outputted from the photoelectric converter 107 varies with the amount of reflection 302 (return light).

In general, the reflectance of an optical disc is higher at a space and the amount of the return light is higher. In contrast, the reflectance is lower at a mark and the amount of the return light is lower. Accordingly, the level of the RF output 303 is higher at a space and lower at a mark. The return light from the optical disc 101 is split by the splitter 104 so as not to return to the laser beam source 108. Actually, however, a part of the return light passes through the splitter 104 and enters the laser beam source 108 as return light. When the laser light enters the laser beam source 108, a change in laser output called scoop noise occurs. When a laser beam scans a space, the amount of return light is greater, so that the intensity of the laser beam emitted from the laser beam source 108 diminishes and the RF signal outputted from the photoelectric converter 107 becomes weaker. On the other hand, when a laser beam scans a mark, the amount of return light is smaller, so that the intensity of the laser beam emitted by the laser beam source 108 increases and the RF signal outputted from the photoelectric converter 107 becomes stronger. In this way, the RF signal varies depending on the position of a mark recorded on a disc.

As a result, the level of the RF signal outputted from the photoelectric converter 107 is higher at a space and lower at a mark as indicated by a waveform 304, which is denoted by a dashed line. Namely, the waveform of the RF output is asymmetric between the positive side and the negative side. This is because oscillation within the laser changes by return light to cause noise, so that the laser output changes.

To avoid the RF output from getting asymmetric in this way, the laser beam emitted by the laser beam source 108 is preferably an intermittent beam modulated with a high-frequency signal, instead of a continuous beam. The intermittent beam can suppress laser noise by reducing the interference between the laser beam and the return light, so that symmetry in the RF output can be maintained.

The inventors of this invention have found through measurement that the symmetry of the RF signal outputted from the photoelectric converter 107 differs depending on the type of optical disc between when a high-frequency signal is superimposed on the laser beam emitted by the laser beam source 108 and when a high-frequency signal is not superimposed. In particular, ROM-type discs and R-type discs showed remarkably different symmetries (refer to FIG. 4).

For example, in a BD-ROM disc, the state in continuous radiation (HF OFF) is compared with the state in normal radiation (HF ON). Comparing beta when the HF has been set at a minimum value (HF=0), namely beta in the state of DC playing under the continuous radiation, with beta when the HF has been set at a value for normal playing (HF=30), the value increases by three times. In contrast, in a case of BD-R discs, the values change a little comparing beta when the HF has been set at the minimum value with beta when the HF has been set at 30. Furthermore, when the HF has been set at zero, the beta of the BD-ROM disc is greater than the beta of the BD-R discs.

In the above description, when HF=0, a high frequency signal is not superimposed on the laser drive signal; and when HF=30, it is a normal condition for playing a Blu-ray Disc (a normal data reading state) with a high frequency signal superimposed on the laser drive signal. The data reading state is a state with high frequency wave superimposed, for example, to play management information or user data recorded on the optical disc 101.

The amount of high frequency signal to be superimposed in this normal playing condition is predetermined depending on the type of disc and the number of layers of the disc; the amount of superimposition is set in accordance with the identified type of the disc. In this connection, the amount of the high frequency signal to be superimposed may be determined after adjusting the predetermined initial value depending on the variation of characteristics of the disc. Adjusting the high frequency signal to meet the normal conditions suitable for playing a disc achieves reduction in laser noise and less error rate (SER: Symbol Error Rate) in playing a disc.

Utilizing the characteristic that the asymmetry of the RF signal changes with the setting of the HF, the type of an optical disc can be identified by measuring the asymmetry of the RF signal outputted from the photoelectric converter 107 with change of the amplitude of the high frequency signal superimposed on the laser beam outputted by the laser beam source 108.

The asymmetry of the RF signal can be calculated by Beta expressed in the following Expression (1):

$$\text{Beta} = \frac{(B+A)}{(B-A)} \quad (1)$$

In the Expression (1), A represents an amplitude between a positive peak of the RF signal and the zero level and B represents an amplitude between a negative peak of the RF signal and the zero level. In other words, a value of Beta indicates the extent of unbalance between the positive side amplitude and the negative side amplitude with respect to the total amplitude and is expressed by percent. Although the value of Beta is used as an index in writing data, it may be used in playing data.

The asymmetry of the RF signal can also be calculated by a value of Asymmetry expressed in the following Expression (2):

$$\text{Asymmetry} = \frac{(I_{8H} + I_{8L}) - (I_{2H} + I_{2L})}{2 \times I_{8PP}} \quad (2)$$

In the Expression (2), $I_{8H}$ represents a positive peak voltage of the RF output waveform when reading a 8T mark; $I_{8L}$ represents a negative peak voltage of the RF output waveform when reading the 8T mark. $I_{8PP}$ represents a peak-to-peak voltage of the RF power waveform when reading the 8T mark and can be expressed by $I_{8H}$–$I_{8L}$. $I_{2H}$ represents a positive peak voltage of the RF power waveform when reading a 2T mark and $I_{2L}$ represents a negative peak voltage of the RF power waveform when reading the 2T mark.

Accordingly, the value of Asymmetry is the ratio of the difference between the center of the signal level when reading the longest 8T mark, $(I_{8H}+I_{8L})/2$, and the center of the signal level when reading the shortest 2T mark, $(I_{2H}+I_{2L})/2$, to the peak-to-peak voltage when reading the longest 8T mark, and is expressed by percent.

The value of Asymmetry and the value of Beta are calculated and outputted by the signal processor 110. The outputted Asymmetry (or Beta) is sent to the optical disc identification module 112 and used in optical disc identification, which will be described later.

Figure 5A:
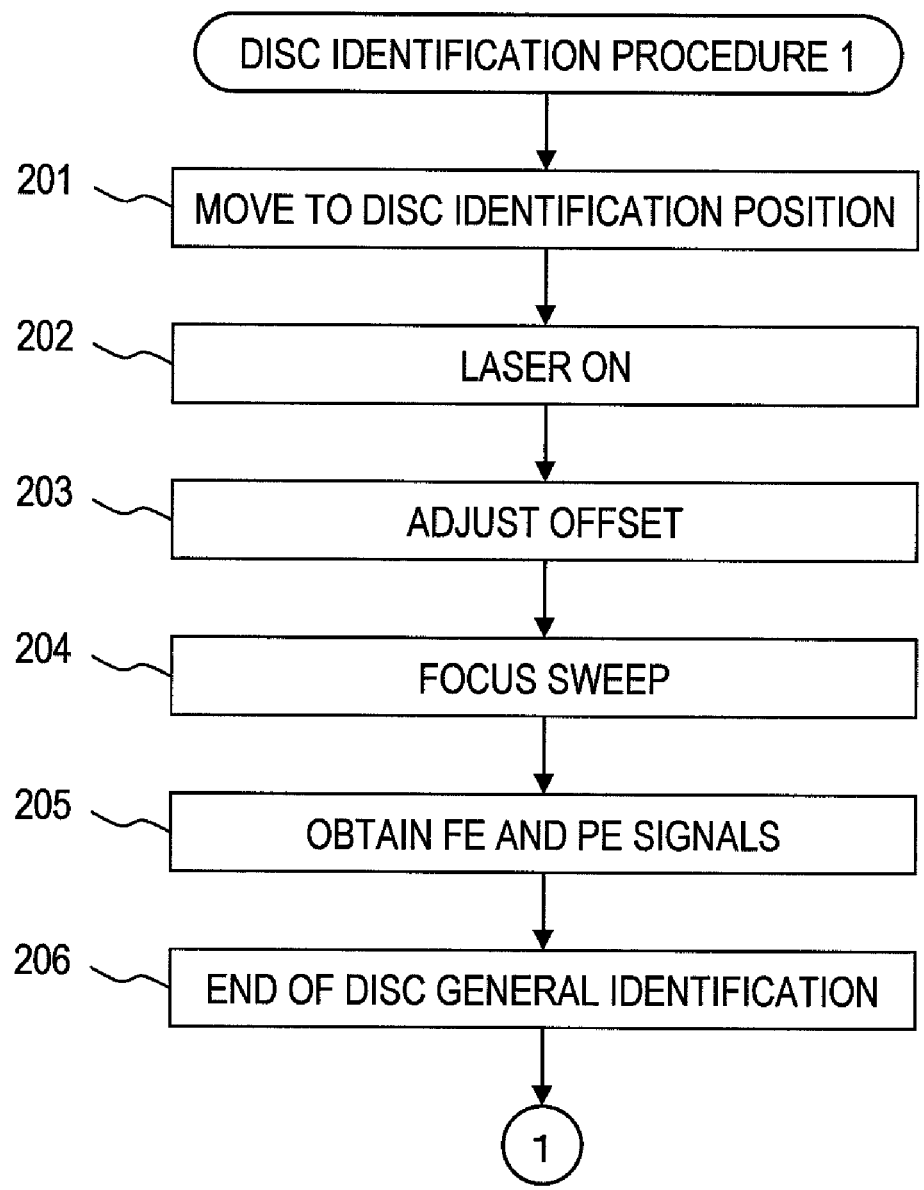
FIGS. 5A and 5B are flowcharts of a disc identification procedure 1 in the optical disc device according to an embodiment of this invention.
Figure 5B:
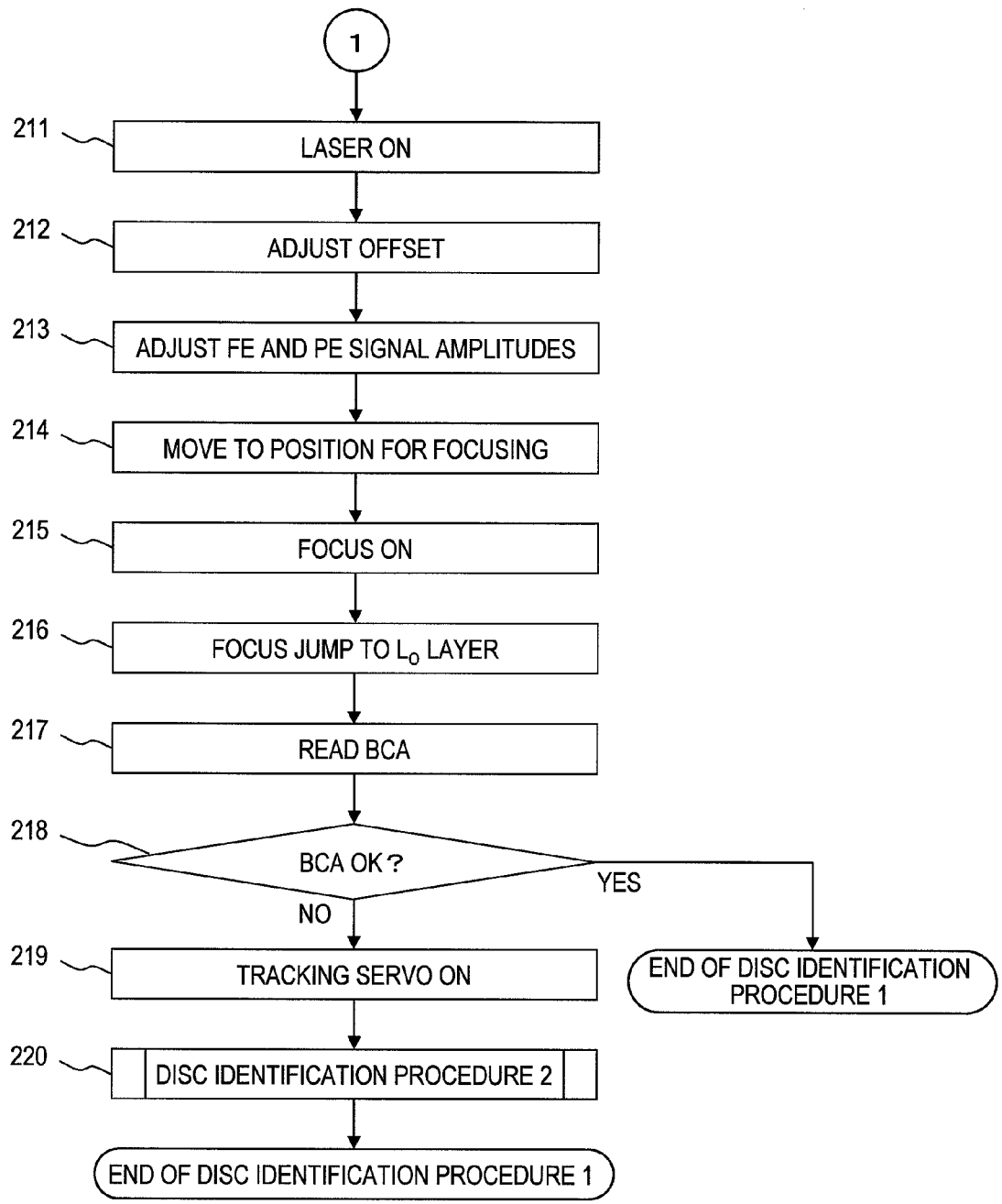

FIGS. 5A and 5B are flowcharts of a disc identification procedure in the optical disc device 100 in the embodiment of this invention. The procedure disclosed in FIGS. 5A and 5B is executed by the optical disc identification module 112.

To identify an optical disc 101 loaded in the optical disc device 100, the procedure first moves the optical pickup 120 to a position for disc identification (for example, the innermost circumference) (201), and turns on the laser beam source 108 to emit a laser beam with a preset initial wavelength and a preset initial amount of light (202).

Next, an offset voltage to be applied to the photoelectric converter 107 is adjusted based on the amount of the return light received by the photoelectric converter 107 (203).

Then, the objective lens 103 is moved by the actuator, starts a focus sweep (204), and a focus error signal (FE) and an intensity signal (PE) are obtained (205).

The position in thickness where the focus error signal is compared with the intensity signal have been obtained with the specifications of discs to locate the recording layer of the loaded disc, and a type of the loaded disc 101 is identified as either a CD, a DVD, or a BD to end the general identification of the disc (206).

Thereafter, the laser beam source is turned on to emit a laser beam with a wavelength for the general type of disc and in the amount of light preset for the type of disc (211), and the offset voltage to be applied to the photoelectric converter 107 is adjusted based on the amount of the return light received by the photoelectric converter 107 (212).

After that, the objective lens 103 is moved by the actuator, a focus error signal (FE) and an intensity signal (PE) are obtained, and the amplitudes of the obtained focus error signal (FE) and intensity signal (PE) are adjusted to match them to their identification thresholds by adjusting the gain with which the signal processor 110 processes the signals (213).

Next, the optical pickup 120 is moved to a position for focusing (214) and focuses on an arbitrary layer (215). Then, the focus jumps onto the layer for disc identification (216). The layer of the destination of the focus jump is usually the $L_0$ layer on which the management information (a BCA in a BD, for example) is recorded.

The management information (BCA) recorded on the destination layer (the $L_0$ layer) (217) is read and it determines whether the management information has been read properly and whether the management information contains the type of disc (218).

If the read management information includes information about the type of disc, the type of the loaded disc is identified, the disc identification procedure is terminated, and a procedure of playing the disc is started.

On the other hand, if the type of disc has not been read, namely, if the management information is not read properly, or if the read management information does not include the type of disc, a disc identification procedure 2 is prepared to execute.

Specifically, it starts a tracking servo to prepare for properly reading data recorded on the disc (219). It should be noted that the tracking servo may be off in measurement of the asymmetry. Then, the disc identification procedure 2 is started (FIGS. 6 and 7) (220).

Figure 6:
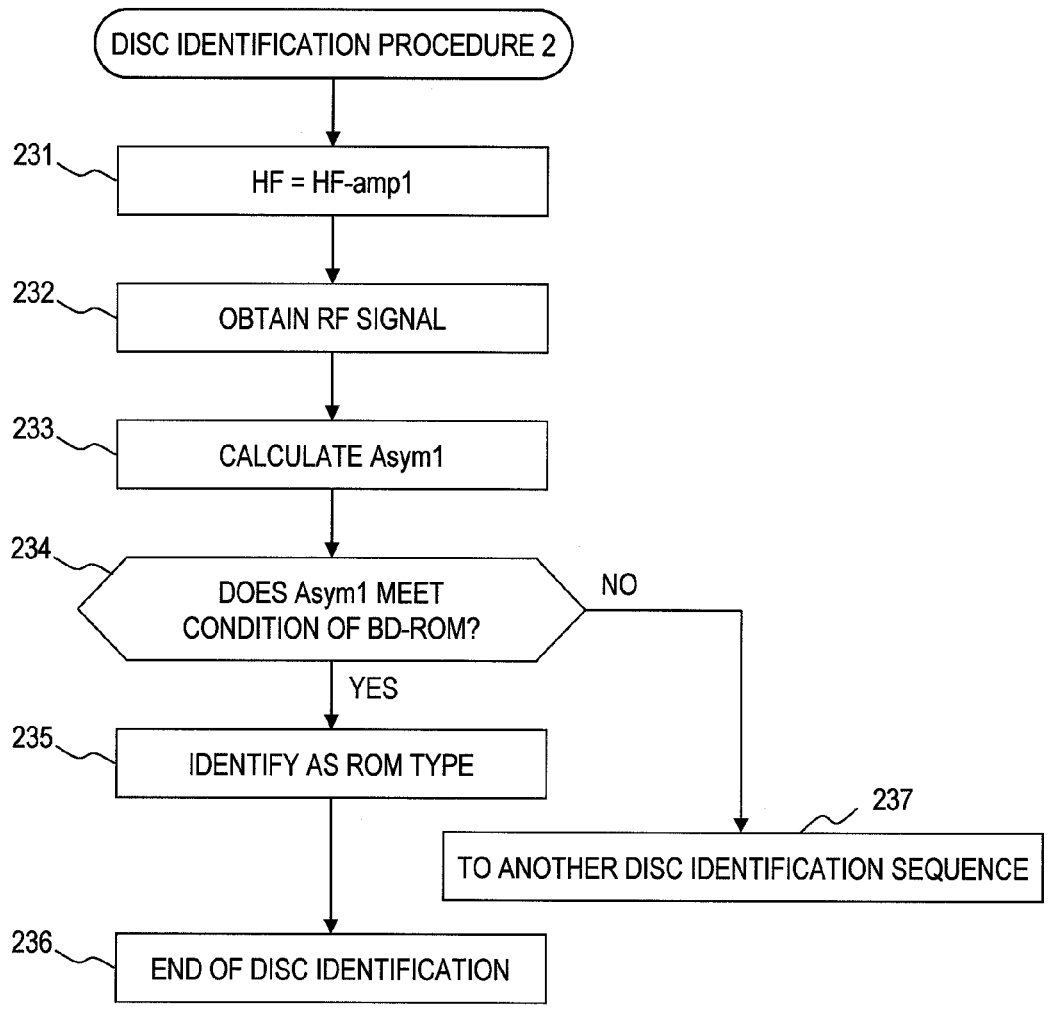
FIG. 6 is a flowchart of an optical disc identification procedure 2 according to an embodiment of this invention.

FIG. 6 is a flowchart of an optical disc identification procedure 2 in the embodiment of this invention; the procedure is executed by the optical disc identification module 112.

First, the optical disc identification module 112 sets the amplitude of the high frequency signal HF-amp1 on the high frequency signal generator 134 and irradiates the optical disc 101 with a laser beam on which the high-frequency signal is superimposed (231). The HF-amp1 is preferably an amplitude of a high-frequency signal which is not for data reading. For example, it may be a minimum amplitude settable to the optical disc device 100 (for example, zero), which is different from the value in normal data reading. This is because, if the amplitude of the superimposed high-frequency signal is zero, the asymmetry of the RF signal outputted from the photoelectric converter 107 will be greatest.

Next, the photoelectric converter 107 receives the return light from the optical disc 101 and outputs an RF signal (232). The signal processor 110 calculates the value of Asymmetry from the RF signal outputted by the photoelectric converter 107 and sends the calculated value of Asymmetry to the optical disc identification module 112 (233).

The optical disc identification module 112 compares the value of Asymmetry (Asym1) of the RF signal outputted from the photoelectric converter 107 with a predetermined threshold to identify the type of the loaded optical disc (234). The threshold is preferably a value with a given margin added to the maximum value which is acceptable to the specification as asymmetry.

In the identification, if the value of Asymmetry is greater than the predetermined threshold, the loaded optical disc is defined as a read only ROM type disc (235), and the optical disc identification procedure is terminated, and the procedure returns to the optical disc identification procedure 1 (236). On the other hand, if the value of Asymmetry is the predetermined threshold value or less, the type of the loaded disc cannot be identified. Therefore, the procedure returns to the optical disc identification procedure 1 and the type of optical disc will be identified by another sequence (237).

As described above, according to the optical disc identification procedure 2 illustrated in FIG. 6, one measurement of Asymmetry after changing the amplitude of the high frequency signal enables the identification of the type of disc, providing a speedy identification of the type of disc.

Figure 7:
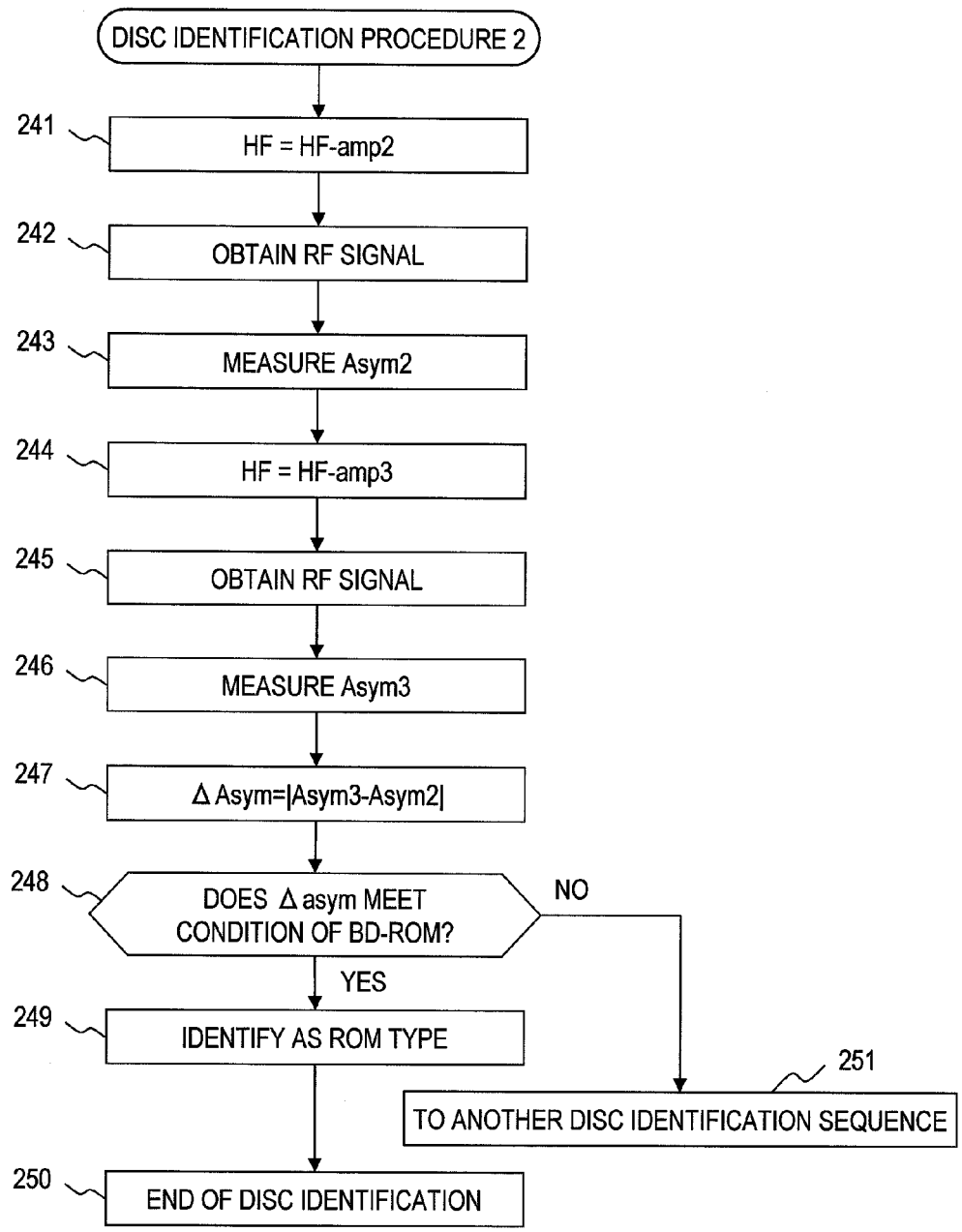
FIG. 7 is a flowchart of a first modified example of the optical disc identification procedure 2 according to an embodiment of this invention.

FIG. 7 is a flowchart of a first modified example of the optical disc identification procedure 2 in the embodiment of this invention.

First, the optical disc identification module 112 sets the amplitude of the high frequency signal HF-amp2 on the high-frequency signal generator 134 and irradiates the optical disc 101 with a laser beam in which the high-frequency signal is superimposed (241). This HF-amp2 is preferably a normal amplitude of the high frequency signal which has been predetermined for the general type of optical disc. This setting of the HF-amp2 to meet the optimum read condition provides a waveform suitable for identification.

Next, the photoelectric converter 107 receives the return light from the optical disc 101 and outputs an RF signal (242). The signal processor 110 calculates the Asymmetry (Asym2) from the RF signal outputted from the photoelectric converter 107 and sends the calculated Asymmetry to the optical disc identification module 112 (243).

The optical disc identification module 112 sets an amplitude of the high frequency signal HF-amp3 on the high-frequency signal generator 134 and irradiates the optical disc 101 with a laser beam in which the high frequency signal is superimposed (244). The HF-amp3 is preferably an amplitude of the high-frequency signal which is not for data reading. For example, it may be a minimum amplitude settable to the optical disc device 100 (for example, zero), which is different from the value in normal data reading. This is because, if the amplitude of the superimposed high-frequency signal is zero, the asymmetry of the RF signal outputted from the photoelectric converter 107 will be greatest.

Next, the photoelectric converter 107 receives the return light from the optical disc 101 and outputs an RF signal (245). The signal processor 110 calculates the value of Asymmetry (Asym3) from the RF signal outputted by the photoelectric converter 107 and sends the calculated value of Asymmetry to the optical disc identification module 112 (246).

With respect to the order of the measurements, the measurement of Asym3 may precede the measurement of Asym2.

The optical disc identification module 112 obtains the difference (ΔAsym) between the value of Asymmetries Asym2 and Asym3 of the RF signal obtained under different conditions of high frequency superimposition (247). Then the obtained difference of Asymmetries (i.e. a variation of Asymmetries) is compared with a predetermined threshold to identify the type of the loaded optical disc (248). This threshold is preferably set at the value obtained by deducting a predetermined margin from a value approximate to the maximum value or the maximum value of the asymmetry acceptable to the specification.

In the identification, if the variation of the asymmetry is more than the predetermined threshold, the optical disc identification module 112 identifies the loaded optical disc as a ROM type disc (249), and terminates the optical disc identification procedure, and the procedure returns to the optical disc identification procedure 1 (250). On the other hand, if the variation of Asymmetry is less than or equal to the predetermined threshold, the type of the loaded optical disc cannot be identified. Therefore, the procedure returns to the optical disc identification procedure 1 and the type of optical disc will be identified by another sequence (251).

As described above, according to the first modified example illustrated in FIG. 7, the type of disc is identified by the variation of Asymmetry caused by changing the amplitude of the high frequency signal, so the type of the loaded disc can be identified even if the amplitude is zero or in the Asymmetry ranges of the specification (under the threshold at 234).

Figure 8:
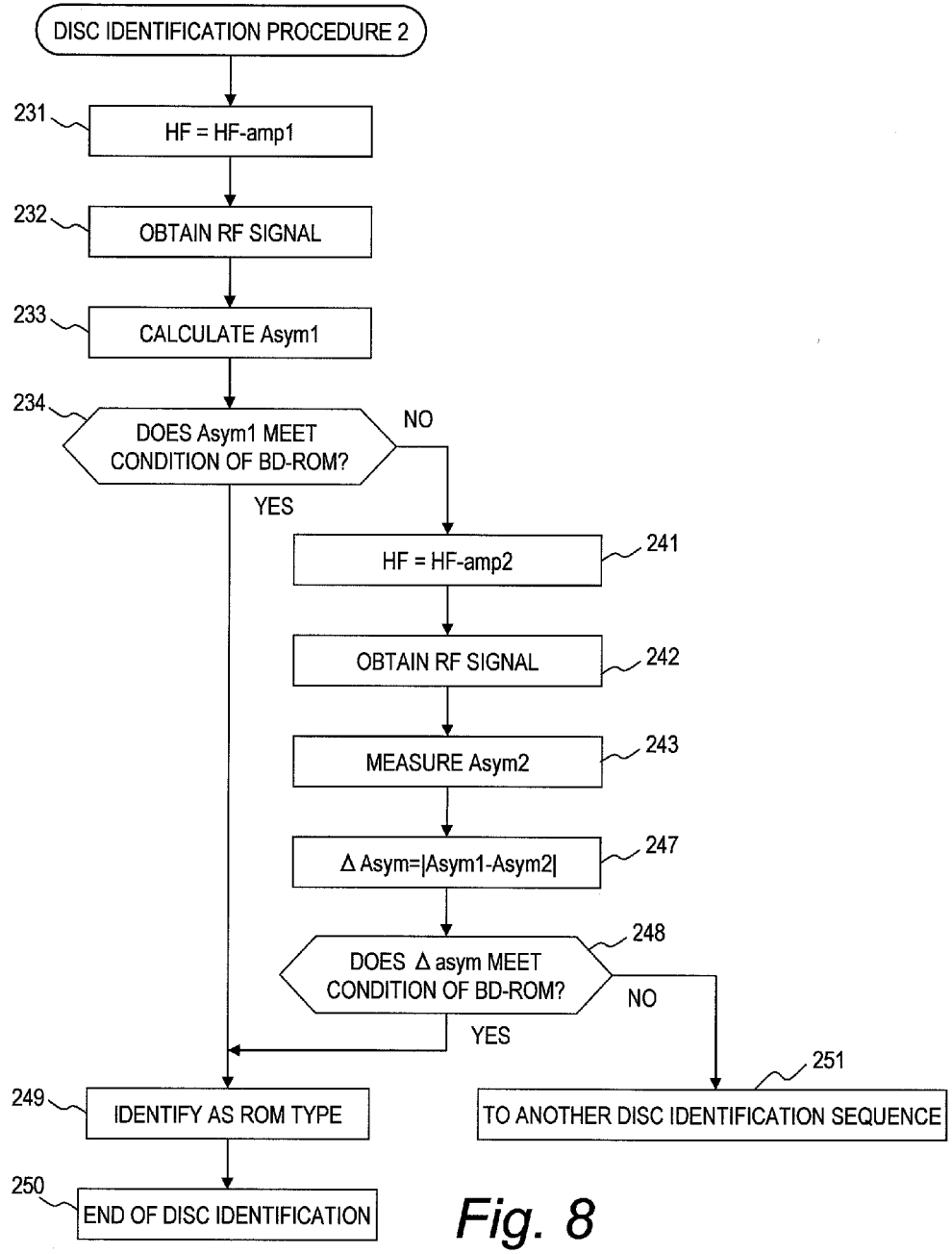
FIG. 8 is a flowchart of a second modified example of the optical disc identification procedure according to an embodiment of this invention.

FIG. 8 is a flowchart of a second modified example of the optical disc identification procedure in the embodiment of this invention.

The second modified example is an optical disc identification procedure of the combination of the procedure illustrated in FIG. 6 and the first modified example illustrated in FIG. 7.

Namely, first, the optical disc identification procedure illustrated in FIG. 6 (231 to 235) is executed. If the type of the loaded optical disc cannot be identified, the steps 241 to 243 and 247 to 251 in the modified example illustrated in FIG. 7 are executed. Since the steps 244 to 246 of the modified example illustrated in FIG. 7 are the same as the steps 231 to 233 in the optical disc identification procedure illustrated in FIG. 6, it is not necessary to measure the asymmetry without the high frequency superimposed in steps 244 to 246; a simplified procedure is achieved.

Although the procedures illustrated in FIGS. 5A, 5B, 6, 7, and 8 have been described to be executed by the optical disc identification module 112, they may be executed by the system controller 114.

The procedures described above use the value of Asymmetry to identify the type of disc, but may use another value (Beta) indicating asymmetry. Otherwise, instead of the asymmetry of the RF output, the amplitude of the RF output may be used to identify the type of disc. This is because, if the asymmetry is found, the amplitude of the RF output will be smaller.

As described above, according to the embodiment of this invention, the symmetry of the RF signal outputted from the photoelectric converter 107 is measured with change of the amplitude of the high frequency signal to be superimposed on the laser beam emitted by the laser beam source 108, or the amplitude of the high frequency signal superimposed on the laser drive signal. Since the type of disc is identified by variation of symmetry of the RF signal caused by changing the amplitude of the high frequency signal, the disc identification is achieved with high reliability.

While the present invention has been described in detail and pictorially in the accompanying drawings, the present invention is not limited to such detail but covers various obvious modifications and equivalent arrangements, which fall within the purview of the appended claims.

What is claimed is:

1. An optical disc device, comprising:
a light source driven by a drive signal with a high frequency signal superimposed;
a detector for detecting return light emitted from the light source; and
a controller for controlling the amplitude of the high frequency signal to be superimposed on the drive signal,
the optical disc device being configured to read data from an optical disc loaded therein by a signal outputted from the detector, wherein:
the controller causes the light source to irradiate the loaded optical disc with light in a condition in which a high frequency signal different from a high frequency signal for data reading is superimposed on the drive signal;
the controller identifies a type of the loaded optical disc based on the return light from the loaded optical disc detected by the detector;
the controller measures a first asymmetry from an output of the detector without a high frequency signal superimposed on the drive signal; and
the controller identifies the type of the loaded optical disc as either a writable disc or a read only disc based on a comparison result of the measured first asymmetry with a predetermined threshold.

2. The optical disc device according to claim 1, wherein:
the controller measures a second asymmetry of an output from the detector with a high frequency signal for data reading superimposed in a case where the type of the loaded optical disc cannot be identified based on the measured first asymmetry; and the controller identifies the type of the loaded optical disc as either a writable disc or a read only disc based on a comparison result of the difference between the measured first asymmetry and the measured second asymmetry with a predetermined threshold.

3. The optical disc device according to claim 1, wherein:
the optical disc device reads information of the type of disc from a management information recording area of the loaded optical disc; and
the controller identifies the type of the loaded optical disc as either a writable disc or a read only disc by using the measured first asymmetry in a case where the type of the loaded disc cannot be identified based on the read information.

4. The optical disc device according to claim 1, wherein:
the controller measures a first asymmetry of an output from the detector without a high frequency signal superimposed on the drive signal;
the controller measures a second asymmetry of an output from the detector with a high frequency signal for data reading superimposed; and
the controller identifies the type of the loaded optical disc as either a writable disc or a read only disc based on a comparison result of the difference between the measured first asymmetry and the measured second asymmetry with a predetermined threshold.

5. The optical disc device according to claim 4, wherein:
the optical disc device reads information of the type of disc from a management information recording area of the loaded optical disc; and
the controller identifies the type of the loaded optical disc as either a writable disc or a read only disc by using the measured first asymmetry and the measured second asymmetry in a case where the type of the loaded disc cannot be identified based on the read information.

6. A disc identification method executed in an optical disc device which has a light source driven by a drive signal with a high frequency signal superimposed, a detector for detecting return light emitted from the light source, and a controller for controlling the amplitude of the high frequency signal to be superimposed onto the drive signal and reads data from an optical disc loaded therein by a signal from the detector, including the steps of:
irradiating, by the light source, the loaded optical disc with light in a condition in which a high frequency signal different from a high frequency signal for data reading is superimposed on the drive signal;
identifying, by the controller, a type of the loaded optical disc based on the return light from the loaded optical disc detected by the detector,
measuring, by the controller, a first asymmetry of an output from the detector without a high frequency superimposed on the drive signal; and
identifying, by the controller, the type of the loaded optical disc as either a writable disc or a read only disc based on a comparison result of the measured first asymmetry with a predetermined threshold.

7. The disc identification method according to claim 6, further including the steps of:
measuring, by the controller, a second asymmetry of an output from the detector with a high frequency signal for data reading superimposed in a case where the type of the loaded optical disc cannot be identified based on the measured first asymmetry; and
identifying, by the controller, the type of the loaded optical disc as either a writable disc or a read only disc based on a comparison result of the difference between the measured first asymmetry and the measured second asymmetry with a predetermined threshold.

8. The disc identification method according to claim 6, further including the steps of:
reading, by the optical disc device, information of the type of disc from a management information recording area of the loaded optical disc; and
identifying, by the controller, the type of the loaded optical disc as either a writable disc or a read only disc by using the measured first asymmetry in a case where the type of the loaded disc cannot be identified based on the read information.

9. The disc identification method according to claim 6, further including the steps of:
measuring, by the controller, a first asymmetry of an output from the detector without a high frequency signal superimposed on the drive signal;
measuring, by the controller, a second asymmetry of an output from the detector with a high frequency signal in data reading superimposed; and
identifying, by the controller, the type of the loaded optical disc as either a writable disc or a read only disc based on a comparison result of the difference between the measured first asymmetry and the measured second asymmetry with a predetermined threshold.

10. The disc identification method according to claim 9, further including the steps of:
reading, by optical disc device, information of the type of disc from a management information recording area of the loaded optical disc; and
identifying, by the controller, the type of the loaded optical disc as either a writable disc or a read only disc by using the measured first asymmetry and the measured second asymmetry in a case where the type of the loaded disc cannot be identified based on the read information.

* * * * *